United States Patent
Pallath et al.

(10) Patent No.: US 11,036,766 B2
(45) Date of Patent: *Jun. 15, 2021

(54) TIME SERIES ANALYSIS USING A CLUSTERING BASED SYMBOLIC REPRESENTATION

(71) Applicant: BUSINESS OBJECTS SOFTWARE LTD., Dublin (IE)

(72) Inventors: Paul Pallath, Naas (IE); Ying Wu, Maynooth (IE)

(73) Assignee: Business Objects Software Ltd., Dublin (IE)

( * ) Notice: Subject to any disclaimer, the term of this patent is extended or adjusted under 35 U.S.C. 154(b) by 133 days.

This patent is subject to a terminal disclaimer.

(21) Appl. No.: 16/277,725

(22) Filed: Feb. 15, 2019

(65) Prior Publication Data
US 2019/0179835 A1 Jun. 13, 2019

Related U.S. Application Data

(63) Continuation of application No. 15/364,681, filed on Nov. 30, 2016, now Pat. No. 10,248,713.

(51) Int. Cl.
*G06F 16/2458* (2019.01)
*G06F 16/28* (2019.01)
*G06N 20/00* (2019.01)
*G06N 20/20* (2019.01)

(52) U.S. Cl.
CPC ........ *G06F 16/285* (2019.01); *G06F 16/2465* (2019.01); *G06N 20/00* (2019.01); *G06N 20/20* (2019.01)

(58) Field of Classification Search
CPC ... G06F 16/285; G06F 16/2465; G06N 20/00; G06N 20/10; G06N 20/20
See application file for complete search history.

(56) References Cited

U.S. PATENT DOCUMENTS

| | | | |
|---|---|---|---|
| 6,100,901 A | 8/2000 | Mohda | |
| 7,310,598 B1 | 12/2007 | Mikhael | |
| 8,429,163 B1 | 4/2013 | Ahmadullin | |
| 10,191,966 B2 | 1/2019 | Pallath et al. | |
| 2004/0184563 A1 | 9/2004 | Bach | |
| 2014/0235474 A1 | 8/2014 | Tang | |
| 2016/0170742 A1 | 6/2016 | Pallath et al. | |

(Continued)

*Primary Examiner* — Jorge A Casanova
(74) *Attorney, Agent, or Firm* — Fish & Richardson P.C.

(57) ABSTRACT

Techniques are described for performing a time series analysis using a clustering based symbolic representation. Implementations employ a clustering based symbolic representation applied to time series data. In some implementations, the time series data is discretized into subsequences with regular time intervals, and symbols encoding the time intervals may be derived by performing clustering algorithms on the subsequences. In the new representation, a time series is transformed into a sequence of categorical values. The symbolic representation is suitable to perform time series classification and forecast with higher accuracy and greater efficiency compared to previously used techniques. Through use of the symbolic representation, a dimension reduction is applied to transform the time sequences to a feature space with lower dimensions. As output of such transformation, a new representation is obtained based on the original time series. This new reduced-dimension representation improves the efficiency of time series data mining and forecasting.

20 Claims, 14 Drawing Sheets

(56) References Cited

U.S. PATENT DOCUMENTS

| | | |
|---|---|---|
| 2016/0371601 A1 | 12/2016 | Grove |
| 2017/0102978 A1 | 4/2017 | Pallath et al. |
| 2017/0249661 A1 | 8/2017 | Alzate |
| 2017/0364818 A1 | 12/2017 | Wu et al. |
| 2018/0028079 A1 | 2/2018 | Gurevich |

TIME SERIES ANALYSIS USING A CLUSTERING BASED SYMBOLIC REPRESENTATION

CLAIM OF PRIORITY

This application claims priority under 35 USC § 120 to U.S. patent application Ser. No. 15/364,681, filed on Nov. 30, 2016, the entire contents of which are hereby incorporated by reference.

BACKGROUND

Time series data is of growing importance in a wide range of domains and applications such as predictive maintenance, database applications, and so forth. Consequently, much research has been done on time series data mining, focusing on forecasting, indexing, clustering, classification, and anomaly detection. Time series data is generally collected in the form of a sequence of real numbers, where each number is a value at a time point. Time series data can be of high dimension and may exhibit a high degree of feature correlation. Such characteristics make time series data mining tasks difficult, which has been described as the dimensionality curse problem. Handling high dimension time series data can be expensive with respect to processing and storage costs. Thus, applying currently used techniques to handle high dimension time series data can degrade the performance of time series data mining algorithms, while also degrading the performance of computing systems on which the analysis is performed.

SUMMARY

Implementations of the present disclosure are generally directed to analysis of time series data. More particularly, implementations of the present disclosure are directed to performing a time series analysis using a clustering based symbolic representation.

In general, innovative aspects of the subject matter described in this specification can be embodied in methods that include actions of: receiving time series data that includes a plurality of time series; determining a time window matrix that includes the plurality of time series each divided into a plurality of subsequences; executing a clustering algorithm to determine clusters, each of the clusters including a set of subsequences that represent a similar pattern among the subsequences of the plurality of time series; modifying the time window matrix by replacing one or more data elements of the time window matrix with one or more symbols that each correspond to a cluster; employing the modified time window matrix to determine one or more discretized time series with a symbolic representation; and employing the symbolic representation of the one or more time series to determine at least one prediction regarding the time series data.

These and other implementations can each optionally include one or more of the following innovative features: the clustering algorithm is a K-means clustering algorithm; the actions further include determining a symbol for each of the clusters, wherein the symbol for a cluster corresponds to the centroid of the cluster; the similar pattern exhibited by subsequences in a cluster represents one or more common underlying features of the subsequences, including one or more of an increase, a decrease, or an inflection in the time series data included in the subsequences in the cluster; employing the modified time window matrix to determine the at least one prediction further includes receiving time series training data with target values, performing a classification algorithm to determine a trained classification model based on the modified time window matrix and the time series training data, and/or employing the trained classification model to determine the at least one prediction; the classification algorithm is a Random Forest algorithm; employing the modified time window matrix to determine the at least one prediction further includes receiving a second set of time series data with a same time structure as the time series training data, applying a trained clustering model on the time window matrix to discretize the second set of time series data, and/or applying the trained classification model to determine the at least one prediction using the discretized second set of time series data as input; the at least one prediction includes at least one target label for the second set of time series data; and/or the actions further include transmitting a signal to cause a service to perform an action based on the at least one prediction.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
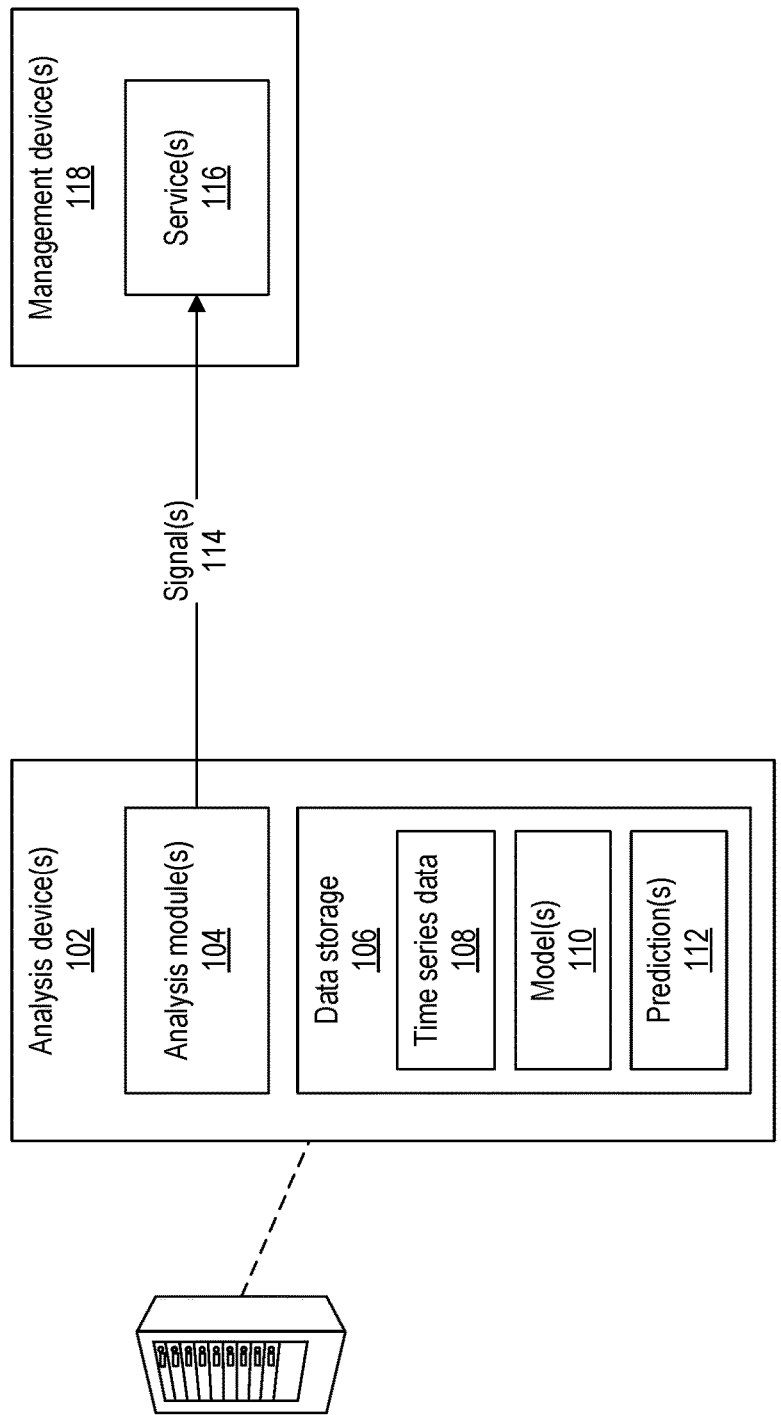
FIG. 1 depicts an example system for analyzing time series data, according to implementations of the present disclosure.

Implementations of the present disclosure are directed to systems, devices, methods, and computer-readable media for performing a time series analysis using a clustering based symbolic representation. In some implementations, a dimension reduction algorithm is applied to transform the time sequences to a new feature space with lower dimensions. As output of such transformation, a new representation is obtained based on the original time series. This new representation can improve the ease and efficiency of time series data mining. Implementations employ a clustering based symbolic representation. In some implementations, the time series is discretized into regular (e.g., equal) time intervals, and symbols encoding the time intervals may be derived by performing clustering algorithms. In the new representation, a time series is transformed into a sequence of categorical values. The symbolic representation is suitable to perform time series classification and forecast with higher accuracy and greater efficiency compared to previously used techniques.

A time series is a set of data that describes a sequence of events in a chronological order. In a time series, a data point, value, or set of values (e.g., vector) is associated with a particular point in time (e.g., specified by a date and/or time descriptor). Time series may be generated from a system of Internet-of-things (IoT) devices, financial transactions, parcel tracking, interactions of a user on web portals, and/or other inputs and scenarios. Time series data may be analyzed to identify a pattern across any suitable time scale, such as a day, week, month, and so forth. Time series data may be analyzed to determine the effects of a lag in the data. For example, an event that occurred three days previously may provide an indication of what could happen three days in the future. Time series data may be generated based on a signal over time, and the signal may be decomposed into fragments that are points in time.

Some time series may exhibit segments, e.g., commonalities, which occur across different types of time series. Accordingly, implementations employ clustering to identify various twined patterns that occur in time series data, across different time series, and such patterns may be identified automatically even without explicitly indicating to the algorithm what pattern is to be identified. Patterns, such as common characteristics across different time series, may be labeled such that, whenever a new pattern appears in a time series, it can be associated with one of the previously identified patterns found in other time series for a particular type of data. In some instances, those previously identified patterns may provide insight to systems as to possible future characteristics in the time period.

Numerous representation algorithms have been previously proposed to address the dimensionality curse problem, in which increasing dimensions of data and/or increasing amounts of data lead to a scaling effect that rapidly consumes the memory and/or processing capacity of the computing devices performing an analysis, leading to ever greater requirements for computing resources. The algorithms most commonly used to address this problem include the Discrete Fourier Transform (DFT), the Discrete Wavelet Transform (DWT), the Discrete Cosine Transform (DCT), the Dynamic Time Warping (DTW), the Piecewise Aggregate Approximation (PAA). and the Singular Value Decomposition (SVD). For all these algorithms, the new representations consist of numerical values to represent each time interval.

Symbolic representation may also be used where the time interval is characterized by categorical variables. The most commonly used symbolic representation is the SAX algorithm, in which the time series is discretized into regular, fixed time windows and symbols are defined to encode the mean values of time windows. In the SAX algorithm, the PAA algorithm is first performed as an initial dimension reducing stage. As output, the original time series is divided into equidistant time windows and the dimension is reduced by replacing all observations in the same time window with the calculated mean values. The PAA representation is then transformed to the SAX representation by mapping the calculated mean values to symbols, where a set of PAA coefficients are identified. Based on an assumption of normality of the PAA coefficients, the distribution space is divided into a predefined number of segments, where the cutoff lines can be extracted and different symbols are assigned to segments between cutoff lines. To obtain the SAX representation, each PAA coefficient is replaced by the corresponding symbol for the segment that the PAA coefficient is in. In some instances, the SAX algorithm outperforms other time series representations in time series data mining tasks.

In SAX, an aggregated value is calculated to represent the subsequence of a time window, and symbols in a symbolic representation can be derived for time windows according to those aggregated values. In contrast to SAX, the implementations described herein provide a clustering-based symbolic representation algorithm for time series data mining. Unlike the SAX algorithm, implementations employ an algorithm that determines the symbols based on the underlying structure of the subsequences of time windows. Moreover, implementations contrast with the SAX algorithm which assumes a normal distribution of the data in the various time windows. In contrast to SAX, implementations provide a discretization process in the algorithm that accounts for subsequences of time windows that exhibit different (e.g., non-normal) underlying structures. Accordingly, in some implementations, the common features extracted from the underlying structures of these subsequences may be used to represent each time window. Implementations account for the dynamic nature of the patterns in the time series data, and are not restricted to the rigid patterns assumed by the SAX algorithm.

For example, implementations may examine time windows in which the data is trending upwards, or trending downwards, from the beginning to the end of the time window. The clustering based symbolic representation technique described herein may cluster time windows that exhibit similar trends over time, and assign symbol(s) to such cluster(s) that reflect this behavior. Using currently employed techniques such as SAX, which may assume a normal distribution of the data in the time windows, an algorithm would identify the mean of the data points but would not capture the underlying behavior (e.g., the upward or downward change in the data). Stated somewhat differently, SAX may determine an average value of the data within a time period, but the average is not representative of the fluctuations that may be present in the time period. Accordingly, information regarding the fluctuations is lost through application of the SAX algorithm.

A time series dataset with N time series can be described as $X=\{x_1, \ldots, x_N\}$, where each time series $x_n$ is in dimension D, and $x_n \in R^D$ where R is the set of real numbers. In some implementations, the time series is first sliced along the time axis into M equal length time windows. Thus, one sliced time series forms M subsequences with dimension $D_s=D/M$, or D divided by M. By combining the subsequences of the various time series, the original time series data is transformed into a time window matrix, $S=\{s_1, \ldots, s_{Ns}\}$, with $N_s=N \times M$ time windows in dimension $D_s$. To capture the underlying structure of subsequences in S, a clustering algorithm is performed. In some implementations, the clustering algorithm is the K-means algorithm. Other clustering algorithms may also be employed, including but not limited to the density-based spatial clustering of applications with noise (DBSCAN) algorithm, the balanced iterative reducing and clustering using hierarchies (BIRCH) algorithm, and so forth. Data clustering is a data exploration technique that groups data objects based on information found in the data that describes the objects and their relationships. The goal of clustering is that the objects in the same cluster are to have similar characteristics which are different from the characteristics of the objects in other clusters. Based on the time window matrix S as input, a set of cluster centroids, $C=\{C_1, \ldots, C_k\}$ may be randomly initialized.

Each subsequence in S may be assigned to its closest cluster centroid and the cluster centroids may then be iteratively optimized by minimizing the following objective function, Example Function 1.

$$J = \min_C \sum_{j=1}^{k} \sum_{i \in C_j} \|s_i - C_j\|^2,$$ Example Function 1

In Example Function 1, k is the predefined number of clusters. With the identified optimal cluster centroids, the sum of mean squared distances from each subsequence to its nearest cluster centroid is minimized. As the result, a set of clusters is identified where the subsequences of time windows from the same cluster have a similar underlying structure. Each identified cluster centroid may represent the common features of the time subsequences in the same cluster. To transform the original time series data, the k cluster centroids may be labeled by symbols. The subsequences belonging to the same cluster may be replaced with the symbol assigned to the corresponding cluster centroid. Finally, by concatenating the symbols that represent subsequences in a time series, a new clustering based symbolic representation is obtained, where the time series is discretized and the dimension is reduced.

In contrast to the SAX representation where symbols are determined by mean values in a PAA representation, the implementations described herein employ an algorithm in which the symbols are derived by taking the underlying structure of all time windows into account. By using the underlying structure in time series representation, implementations take advantage of the extracted common features which can bring more information to the representation, compared to the SAX representation. For example, in SAX when a mean value of one subsequence of time window is calculated in PAA dimension reduction, it becomes the sole factor used to represent the subsequence of a single time window. Accordingly, the SAX discretization only considers simple values in a time windows to determine a symbol, and other information in time windows, such as trend and frequency, are excluded from the representation. This is a disadvantage of SAX, given that the excluded information as well as the underlying structure may be important in distinguishing subsequences of time windows. Thus, SAX leaves out information. In some implementations, this information is employed as described herein to represent time windows. In some implementations, the clustering is performed on the time window matrix, and thus there is no loss of information through the time series discretization. Moreover, in the SAX approach the dimension reduction is first performed by the PAA algorithm and discrete representation is obtained by the SAX algorithm. In contrast, the implementations described herein facilitate dimension reduction and discretization within the same algorithm, thus providing for a more efficient use of processing capacity, runtime memory, and/or other computing resources compared to the SAX approach. By performing the clustering on the subsequences of time windows, implementations provide for the identification of symbols which can then be used to represent subsequences where the dimension is reduced and discretization is fulfilled. Accordingly, the clustering-based symbolic representation approach employed by implementations provided for an algorithm that is performed in a more natural and straightforward way compared to previously used techniques.

The proposed clustering-based symbolic representation described herein can be used in time series data mining tasks, accordingly to one or more implementations. Based on this symbolic representation, the time series classification can be performed with high performance. The classification results may be compared to the results obtained by using real-value directly, and to the results based on the SAX algorithm. As shown in Table 1 below, a number of (e.g., 22) time series datasets may be selected to test the clustering-based symbolic representation in time series classification. These (e.g., 22) datasets may cover different domains and may have different numbers of classes, size of time series data, and/or length of time series. As shown in Table 1 below, implementations that use the clustering based symbolic representation approach provide for improved accuracy compared to using a real-value time series (e.g., evaluated as Real-value error) and using the SAX algorithm (e.g., evaluated as SAX error). In the example of Table 1, given each dataset, the time series data was transformed by performing the clustering-based symbolic representation algorithm. Then the Random Forest algorithm was employed to perform the classification based on the representation. Each dataset includes training data and test data. The training data is used to train the representation and classification models. The test data is used to validate the trained models and evaluate the accuracy. There are two parameters specified in the representation algorithm: the size of time window $D_s$; and the number of clusters k in K-means algorithm. For each dataset, the same classification experiment was repeated 20 times, and the final error rate was determined by calculating a mean value of errors of all the executions.

TABLE 1

| Name | Number of Classes | Size of Training Set | Size of Testing Set | Time Series Length | 1-NN Real-value Error | 1-NN SAX Error | RF Clustering Based Error | $D_s$ | k |
|---|---|---|---|---|---|---|---|---|---|
| Synthetic Control | 6 | 300 | 300 | 60 | 0.12 | 0.02 | 0.06 | 4 | 5 |
| Gun-Point | 2 | 50 | 150 | 150 | 0.087 | 0.18 | 0.087 | 3 | 10 |
| CBF | 3 | 30 | 900 | 128 | 0.148 | 0.104 | 0.07 | 4 | 3 |
| Face (all) | 14 | 560 | 1690 | 131 | 0.286 | 0.330 | 0.337 | 5 | 10 |
| OSU Leaf | 6 | 200 | 242 | 427 | 0.483 | 0.467 | 0.496 | 3 | 2 |
| Swedish Leaf | 15 | 500 | 625 | 128 | 0.211 | 0.483 | 0.264 | 4 | 8 |
| 50Words | 50 | 450 | 455 | 270 | 0.369 | 0.341 | 0.394 | 3 | 4 |
| Trace | 4 | 100 | 100 | 275 | 0.24 | 0.46 | 0.105 | 5 | 10 |
| Two Patterns | 4 | 1000 | 4000 | 128 | 0.093 | 0.081 | 0.079 | 4 | 4 |
| Wafer | 2 | 1000 | 6174 | 152 | 0.0045 | 0.0034 | 0.0067 | 4 | 2 |
| Face (four) | 4 | 24 | 88 | 350 | 0.216 | 0.170 | 0.21 | 5 | 5 |
| Lightning-2 | 2 | 60 | 61 | 637 | 0.246 | 0.213 | 0.242 | 7 | 3 |
| Lightning-7 | 7 | 70 | 73 | 319 | 0.425 | 0.397 | 0.336 | 6 | 4 |
| ECG | 2 | 100 | 100 | 96 | 0.12 | 0.12 | 0.134 | 4 | 4 |
| Adiac | 37 | 390 | 391 | 176 | 0.389 | 0.890 | 0.516 | 4 | 40 |
| Yoga | 2 | 300 | 3000 | 426 | 0.170 | 0.195 | 0.213 | 6 | 3 |
| Fish | 7 | 175 | 175 | 463 | 0.217 | 0.474 | 0.246 | 3 | 5 |
| Plane | 7 | 105 | 105 | 144 | 0.038 | 0.038 | 0.021 | 3 | 4 |
| Car | 4 | 60 | 60 | 577 | 0.267 | 0.333 | 0.289 | 8 | 3 |
| Beef | 5 | 30 | 30 | 470 | 0.467 | 0.567 | 0.298 | 5 | 6 |
| Coffee | 2 | 28 | 28 | 286 | 0.25 | 0.464 | 0.071 | 5 | 4 |
| Olive Oil | 4 | 30 | 30 | 570 | 0.133 | 0.833 | 0.333 | 5 | 2 |

Table 1 shows the error rates of the classification based on the clustering based symbolic representation performed according to implementations described herein. Table 1 also lists the error rates where the classification is performed based on the Euclidean distance (real-value error) and the SAX representation.

As used herein, clustering is a process by which items are grouped together (e.g., in clusters) according to their characteristics. Items that exhibit similar or same characteristics may be grouped into a same cluster. In implementations described herein, clustering is performed to arrange time subsequences of data into clusters according to similarities among the data in the time subsequences. A cluster may be represented by a centroid, which may be a representative time subsequence among the time subsequences in the cluster. The centroid, and the cluster, may then be represented by a symbol which is used in subsequent processing. For example, for time series data that describe a monitored temperature, multiple time series may each be divided into subsequences of a particular length, such as 10 minute subsequences. A first cluster may be arranged around a particular centroid temperature (e.g., 5 degrees Celsius), and a second cluster may be arranged around a different centroid temperature (e.g., 20 degrees Celsius), and so forth. Other clusters may be determined based on trends, changes, and/or other patterns exhibited by the data in the subsequences. For example, a cluster may include subsequences from various time series, where the subsequences include data that shows a pattern of increasing from 8 degrees to 11 degrees during the subsequence time period. Implementations support the clustering based on any suitable type of patterns and/or other characteristics exhibited by the data in the subsequences.

Implementations may employ any suitable symbols that are assigned to clusters. In some instances, a symbol may be an alphanumeric string that is assigned to a cluster. In some instances, the symbol of a cluster may describe the characteristics of the subsequences included in the cluster. Following the example above, a symbol may be "rising from 5 C to 20 C" to describe a cluster of time subsequences that exhibit that particular pattern in their data.

FIG. 1 depicts an example system for analyzing time series data, according to implementations of the present disclosure. As shown in the example of FIG. 1, a system may include one or more analysis devices 102. The analysis device(s) 102 may include any suitable number and type of computing devices, including server computers. The analysis device(s) 102 may execute one or more analysis modules 104 to perform the time series data analysis operations described herein, such as clustering, symbolic representation, classification, prediction (also described as forecasting), and so forth. The analysis device(s) 102 may include data storage 106. Alternatively, the data storage 106 may be external to the analysis device(s) 102, and communicatively coupled to the analysis device(s) 102 over one or more networks. The data storage 106 may store the data that is input to, output from, and/or otherwise generated through the time series analysis described herein. For example, the data storage 106 may store time series data 108 for one or more time series. The data storage 106 may also store model(s) 110, such as the classification model(s) and/or clustering model(s) described herein. The data storage may store prediction(s) 112 or forecasts that are made based on analyzing time series data.

In some implementations, the analysis module(s) 104 may perform various action(s) based on prediction(s) 112 made through the time series data analysis operations described herein. In some instances, the action(s) may include transmitting (or causing to be transmitted) signal(s) 114 to one or more services 116 (e.g., remote service(s)) executing on one or more management device(s) 118. In some instances, the signal(s) 114 may instruct the service(s) 116 to perform various action(s), or discontinue performing various action(s), based on the prediction(s) 112. For example, based on a prediction for future power consumption in a power distribution system, such as a municipal power grid, the analysis module(s) 104 may send signal(s) 114 to instruct the service(s) 116 (e.g., power grid control process(es)), to adjust their power generation and/or power distribution to account to predicted increases or decreases in power consumption.

FIGS. 2A-2H depict flow diagrams of example processes, according to implementations of the present disclosure. Operations of the processes may be performed by one or more of the analysis module(s) 104, the service(s) 116, and/or other software executing on the analysis device(s) 102, the management device(s) 118, or elsewhere.

Figure 2A:
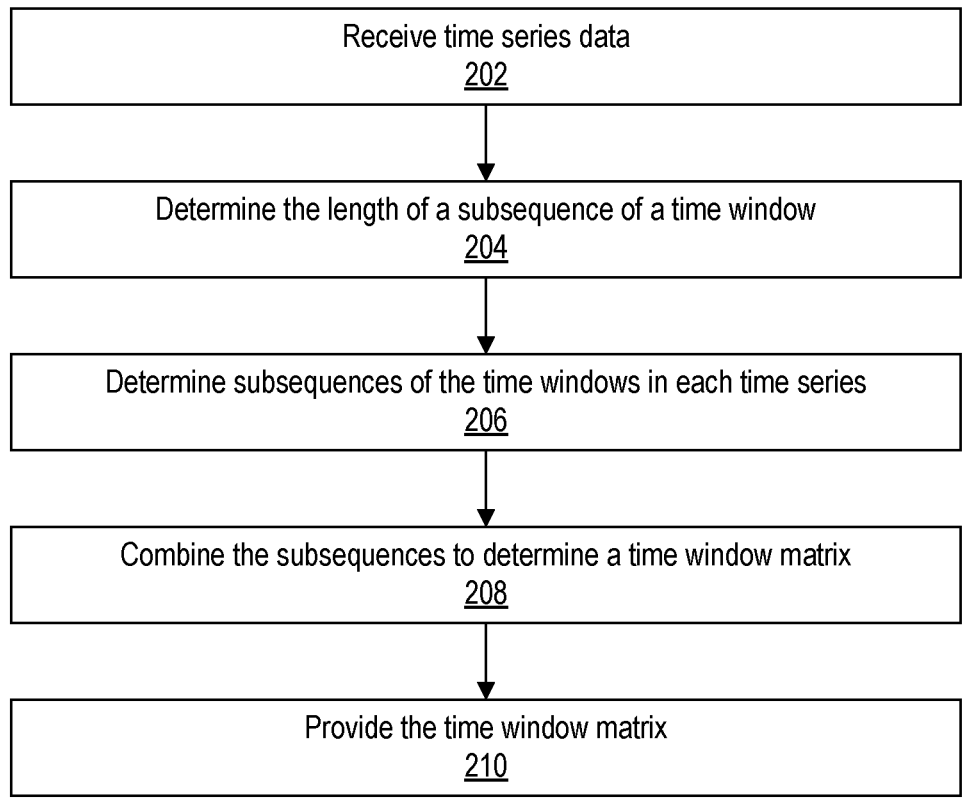
FIG. 2A depicts a flow diagram of an example process for extracting subsequence(s) of time series data, according to implementations of the present disclosure.

FIG. 2A depicts a flow diagram of an example process for extracting subsequence(s) of time series data, according to implementations of the present disclosure.

Time series data may be received (202). In some instances, the time series data is original data that is collected by an executing service, device(s), sensor(s), and so forth. The time series data may include any suitable number of time series that include the same type of data collected during a same time period. For example, power consumption data may be collected from 100 homes over the course of 24 hours, and the data may be organized into 100 different time series that each describes the power consumption in a particular home during the 24 hour period.

The length of a subsequence time window may be determined (204). For example, in a time series spanning 24 hours, a subsequence length of four hours may be determined, such that each time series is divided into six subsequences.

Subsequences may be determined (206) in each time series to be analyzed, the subsequences having a length as determined per 204.

The various subsequences may be combined or otherwise processed to determine (208) a time window matrix.

The time window matrix may be provided (210) for further processing. For example, following the example above, 100 times series each include six subsequences may provide for 600 subsequences arranged into a time window matrix, where one dimension of the matrix is the various time series, and other dimension(s) of the matrix are the time subsequence(s) that divide each of the time series.

Figure 2B:
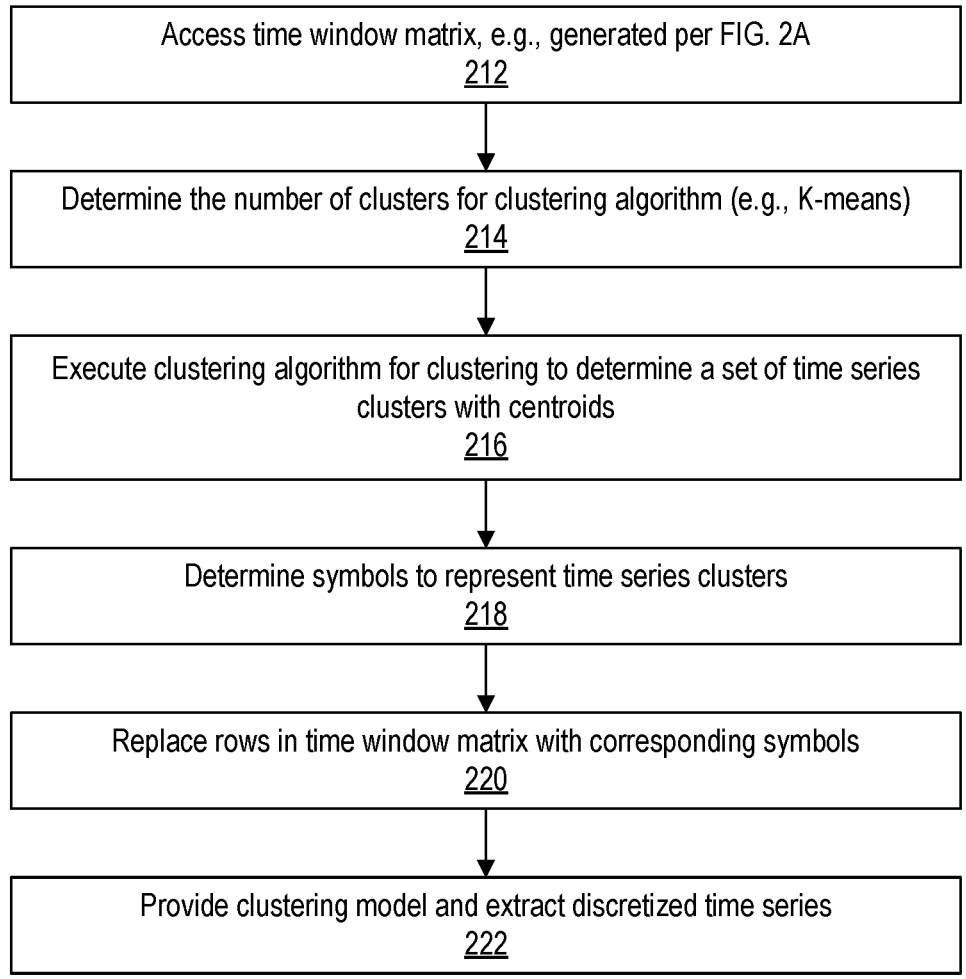
FIG. 2B depicts a flow diagram of an example process for determining a symbolic representation for time series data, according to implementations of the present disclosure.

FIG. 2B depicts a flow diagram of an example process for determining a symbolic representation for time series data, according to implementations of the present disclosure.

A time window matrix, such as that generated per FIG. 2A, may be accessed (212).

A determination may be made (214) of a number of clusters to be used in the clustering algorithm to be executed, e.g., a K-means algorithm. For example, ten clusters may be determined such that the clustering algorithm arranges each of the subsequences into one of the ten clusters. The clustering algorithm may arrange the subsequences as appropriate according to the similar characteristics of the subsequences, and the subsequences may not necessarily be evenly divided among the clusters. For example, the clustering algorithm may output ten clusters with 60 subsequences each, or the clustering algorithm may output ten clusters that include different numbers of the subsequences.

The clustering algorithm may be executed (216) for clustering, to determine a set of time series clusters with centroids. As described above, a particular cluster may include subsequences that exhibit a same, or similar, pattern of data within the subsequences, and/or other similar characteristics among the subsequences. For example, a cluster may include subsequences in which the data is increasing across the span of the time period of the subsequences, and another cluster may include subsequences in which the data is decreasing during the time period. Another cluster may include subsequences in which the data exhibits an inflection point during the time period, e.g., increasing then decreasing during the time period, or decreasing then increasing during the time period. Each cluster may include a particular centroid that characterizes the cluster. The centroid of a cluster may be a subsequence that is characteristic of the subsequences included in the cluster. Symbol(s) may be assigned (218) to represent the time series clusters. A symbol may be a name that is assigned to a cluster. In some instances, the symbol may be descriptive of the characteristics of the subsequences in the cluster. In some instances, the symbol of a cluster corresponds to the centroid of the cluster. For example, given a particular centroid vector, C1=[13.363, 23.798, 31.046], a symbol may be defined as "Cluster 1," "Increasing cluster," "Going up cluster," and so forth.

One or more rows in the time window matrix may be replaced (220) with their corresponding symbol(s), thus reducing the dimensionality of the matrix.

The clustering model may include the used proximity measure and the identified centroids of the clusters. The clustering model may be applied to provide the reduced dimensionality version of the time window matrix. For example, the time subsequence(s) may be replaced with their corresponding symbol(s). Symbols for the same time series may be arranged into a vector and discretized time series may be extracted. Various applications may then use the clustering-based new representation for prediction and/or forecasting as described below.

In some implementations, the number of clusters may be refined over multiple iterations of clustering until an optimal number of clusters is arrived at. For example, the clustering algorithm may be executed with an initial number of clusters (e.g., 2) and the distance between points in the resulting clusters may be analyzed. For one or more subsequent iterations, the number of clusters may be increased and the distance between points in the resulting clusters may be measured or otherwise determined. The iterations may continue until there is no longer any significant change in the distance between subsequent iterations, e.g., until an inflection point is reached after which a greater number of clusters has little effect on the distance between points in the clusters. At that point, the optimal number of clusters may be reached.

Figure 2C:
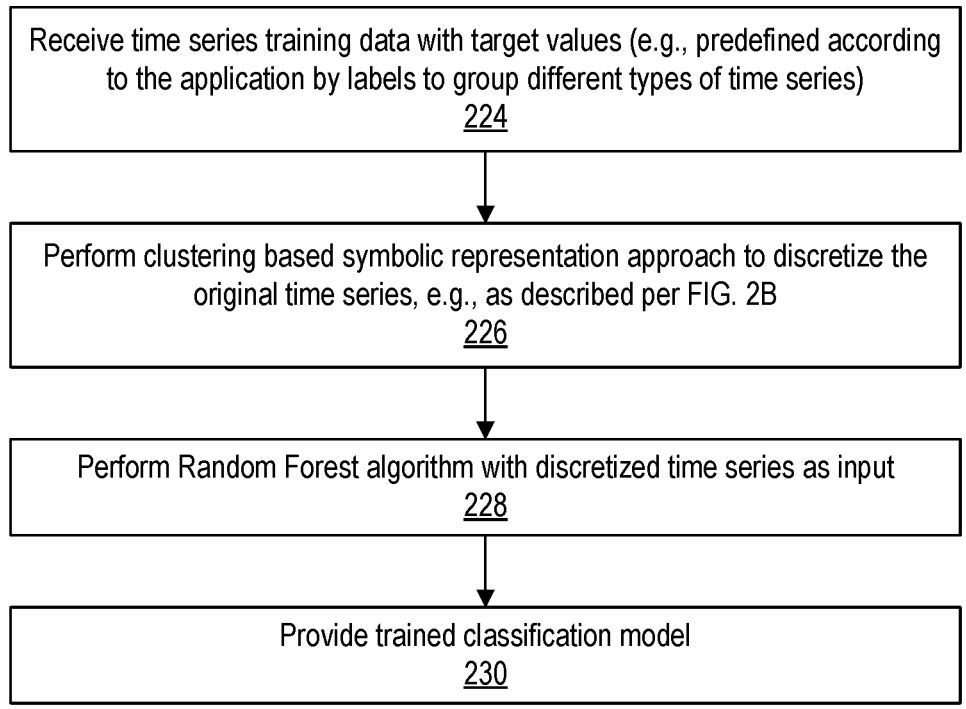
FIG. 2C depicts a flow diagram of an example process for providing a time series classification model, according to implementations of the present disclosure.

FIG. 2C depicts a flow diagram of an example process for providing a time series classification model, according to implementations of the present disclosure. In the example of FIG. 2C, the symbols and clusters determined for the time series data in FIG. 2B may be applied to a different set of time series data, e.g., training data. In this example, the symbols and clusters developed in FIG. 2B are used to generate symbolic representation of the time series and the new representation may in turn be used to train a classification model that may be employed in classifying subsequently received data. The training data for time series classification may include the input variables and the targets. The discretized time series with the new symbolic representation in FIG. 2B may form the input variables and each time series in the training data may be associated with one target label. The target labels may be pre-defined in different applications as part of training data and may be predicted by applying the classification model given subsequently received data.

Time series training data may be received (224). The time series training data may include target values, which may be predefined according to the application by labels to group different types of time series.

Clustering may be performed on the training data using the clustering based symbolic representation approach to discretize the original time series, as described per FIG. 2B.

A Random Forest algorithm may be performed (228) for classification, using the discretized time series as input. Implementations also support the use of any other of suitable classification algorithm instead of, or in addition to, a Random Forest algorithm.

The trained classification model may be provided (230). The classification model may be employed to make various predictions regarding future data points that may be in time series for future time periods, as described with reference to FIG. 2D.

Figure 2D:
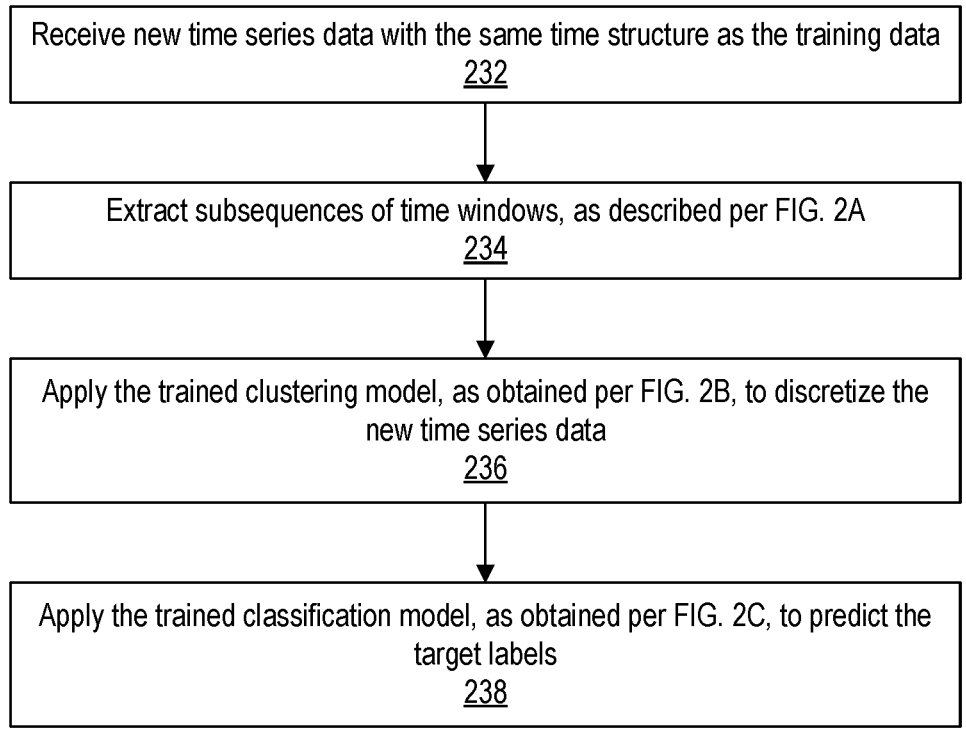
FIG. 2D depicts a flow diagram of an example process for applying a time series classification model, according to implementations of the present disclosure.

FIG. 2D depicts a flow diagram of an example process for applying a time series classification model, according to implementations of the present disclosure.

New time series data may be received (232), e.g., with the same or similar time structure as the training data.

Subsequences of time windows may be extracted (234), as described per FIG. 2A.

The trained clustering model, obtained per FIG. 2B, may be applied (236) to discretize the new time series data. In some implementations, this discretization may include creating the symbolic representation of the new time series using the clustering model as obtained per FIG. 2B, which is trained based on the data by dividing the time series data into subsequences.

The trained classification model, obtained per FIG. 2C, may be applied (238) to predict the target labels for one or more future time periods. For time series classification, the target labels may be pre-defined labels to be associated with time series in training data and to be predicted given new received time series data for one or more future time periods. For example, the model may be developed based on consumer purchase data over a period of time, with time series representing sales data for various stores and/or in different market segments. The model may be developed based on such data, and used to make predictions regarding future purchase activity during one or more future time periods. The target is the symbolic representation that appears given the pattern of symbolic representation that has appeared so far. For classification, the targets may be pre-defined as part of the data.

Figure 2E:
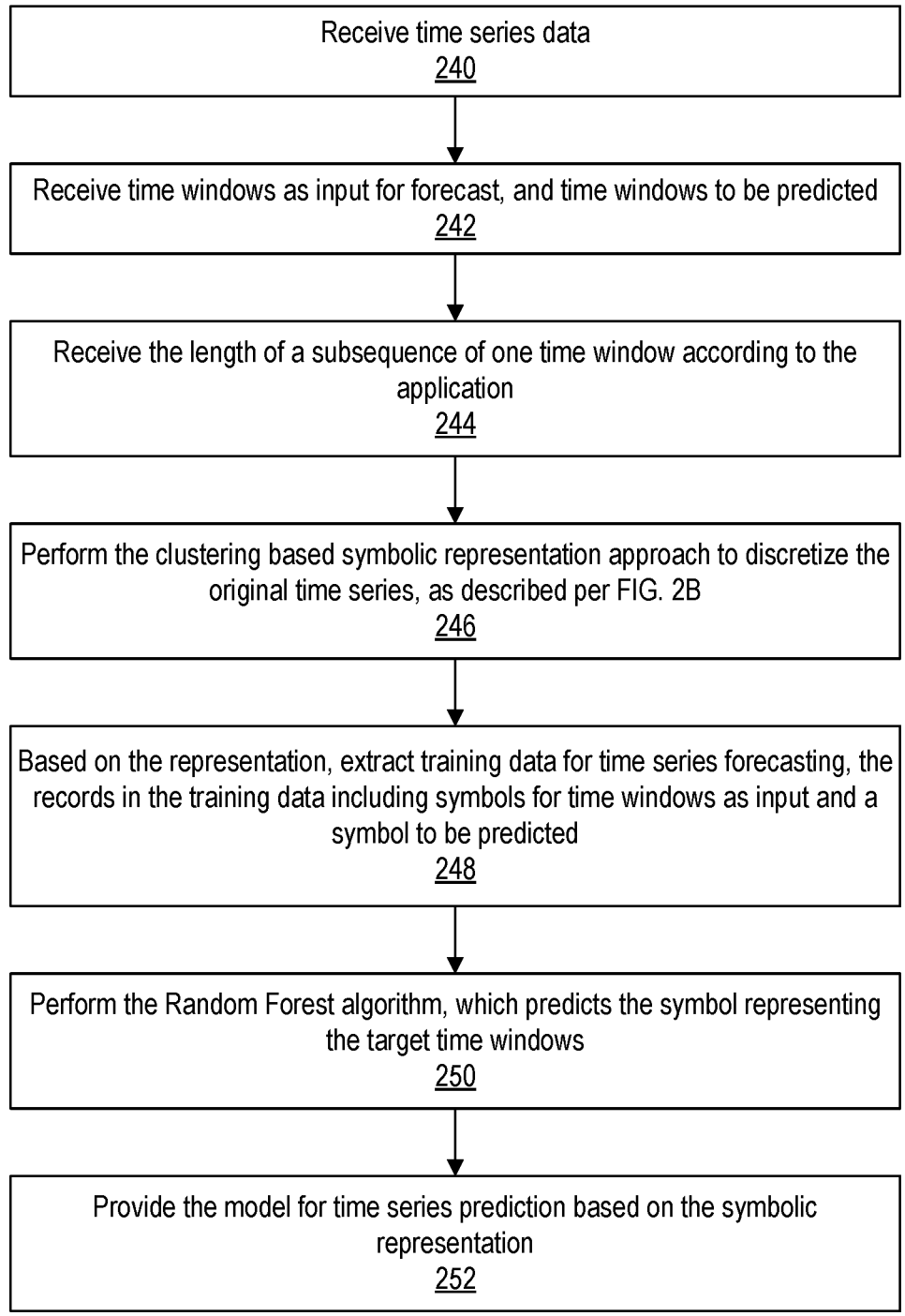
FIG. 2E depicts a flow diagram of an example process for providing a model for time series predictions based on a symbolic representation, according to implementations of the present disclosure.

FIG. 2E depicts a flow diagram of an example process for providing a model for time series predictions based on a symbolic representation, according to implementations of the present disclosure.

Time series data may be received (240).

Time windows may be received (242) as input for a forecast. The future time windows to be predicted may also be received.

The subsequence length for a time window may also be received (244) according to the application.

The clustering based symbolic representation approach may be performed (246) to discretize the original time series, as described per FIG. 2B.

Based on the representation, training data may be extracted (248) for time series forecasting. The records in the training data may include symbols for the time windows as input, and may also include a symbol to be predicted.

The Random Forest algorithm may be performed (250), to predict the symbol representing the target time window.

The model for time series prediction may be provided (252) based on the symbolic representation.

Some of the operations may be performed similarly to operations described with reference to FIG. 2D. In FIG. 2E, the classification performed and then employed for time series forecasting. In some instances, the target variables may be different between FIGS. 2D and 2E. For example, the pre-defined target labels are used in classification, but the extracted symbols are used in forecast.

Figure 2F:
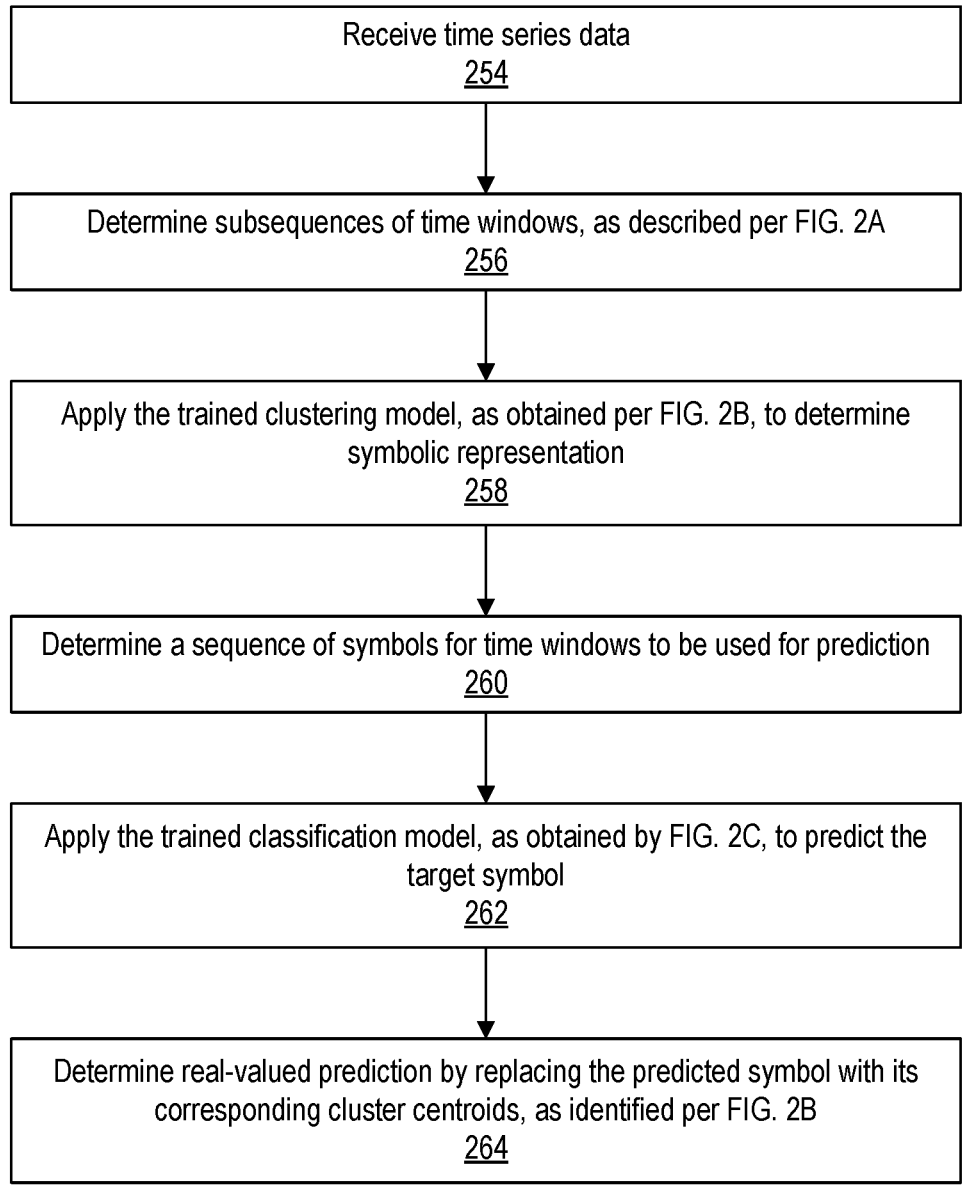
FIG. 2F depicts a flow diagram of an example process for performing a time series forecast, according to implementations of the present disclosure.

FIG. 2F depicts a flow diagram of an example process for performing a time series forecast, according to implementations of the present disclosure.

Time series data may be received (254).

Subsequences of time windows may be determined (256), as described per FIG. 2A.

The trained clustering model, as obtained per FIG. 2B, may be applied (258) to determine a symbolic representation.

A determination may be made (260) of a sequence of symbols for time windows to be used for prediction.

The trained classification model, as determined per FIG. 2C, may be applied (262) to predict the target symbol(s).

A real-valued prediction may be determined (264) by replacing the predicted symbol with its corresponding cluster centroid(s), as identified per FIG. 2B.

In addition to or instead of using a classification model for time series, finding the frequent sequences of patterns in the symbolic representation of time series data may be performed as an alternative way for time series prediction.

Figure 2G:
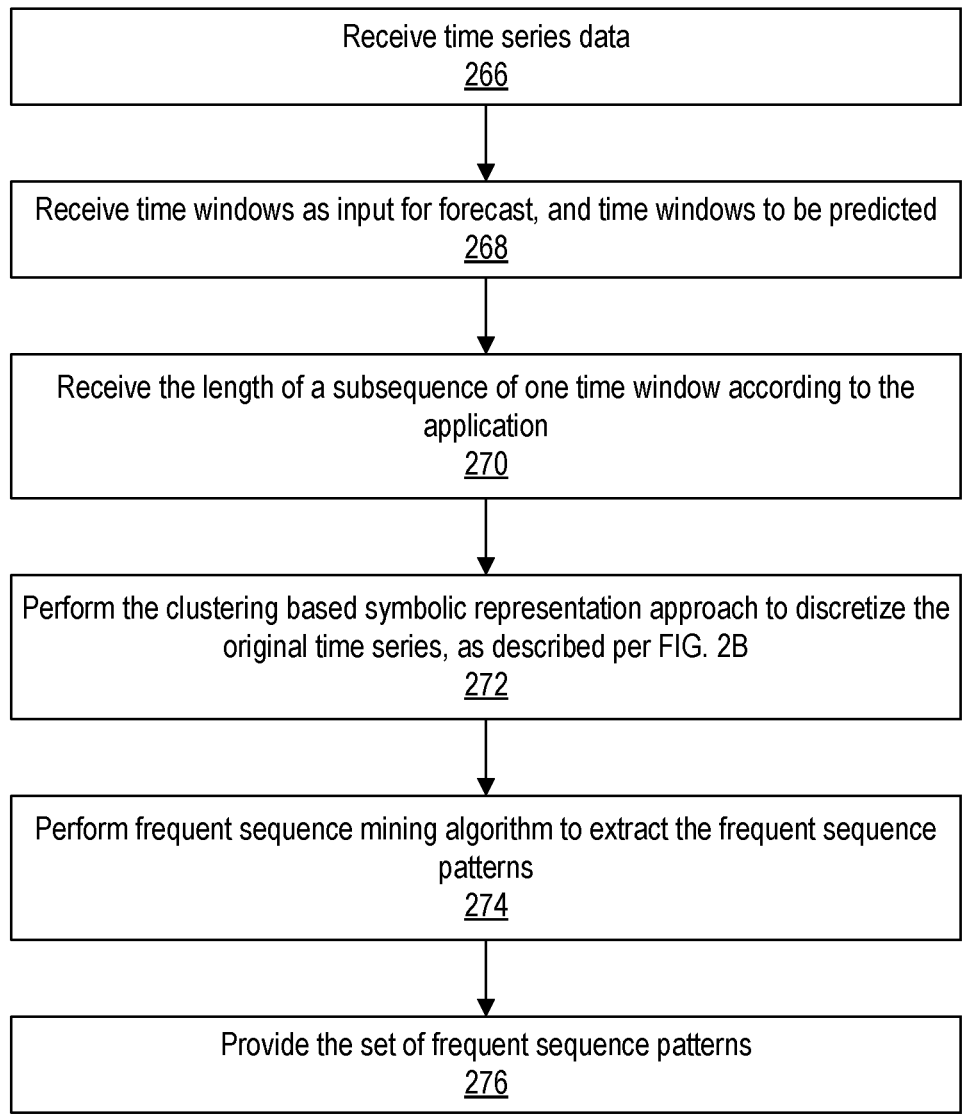
FIG. 2G depicts a flow diagram of an example process for performing a time series forecast based on sequence mining, according to implementations of the present disclosure.

FIG. 2G depicts a flow diagram of an example process for performing a time series forecast based on sequence mining, according to implementations of the present disclosure.

Time series data may be received (266).

Time windows may be received (268) as input for a forecast. The time windows to be predicted may also be received.

The subsequence length of a time window may be received (270) according to the application.

The clustering based symbolic representation approach may be performed (272) to discretize the original time series, as described per FIG. 2B.

A frequent sequence mining algorithm may be performed (274) to extract the frequent sequence patterns.

The frequent sequence patterns may be provided (276).

Figure 2H:
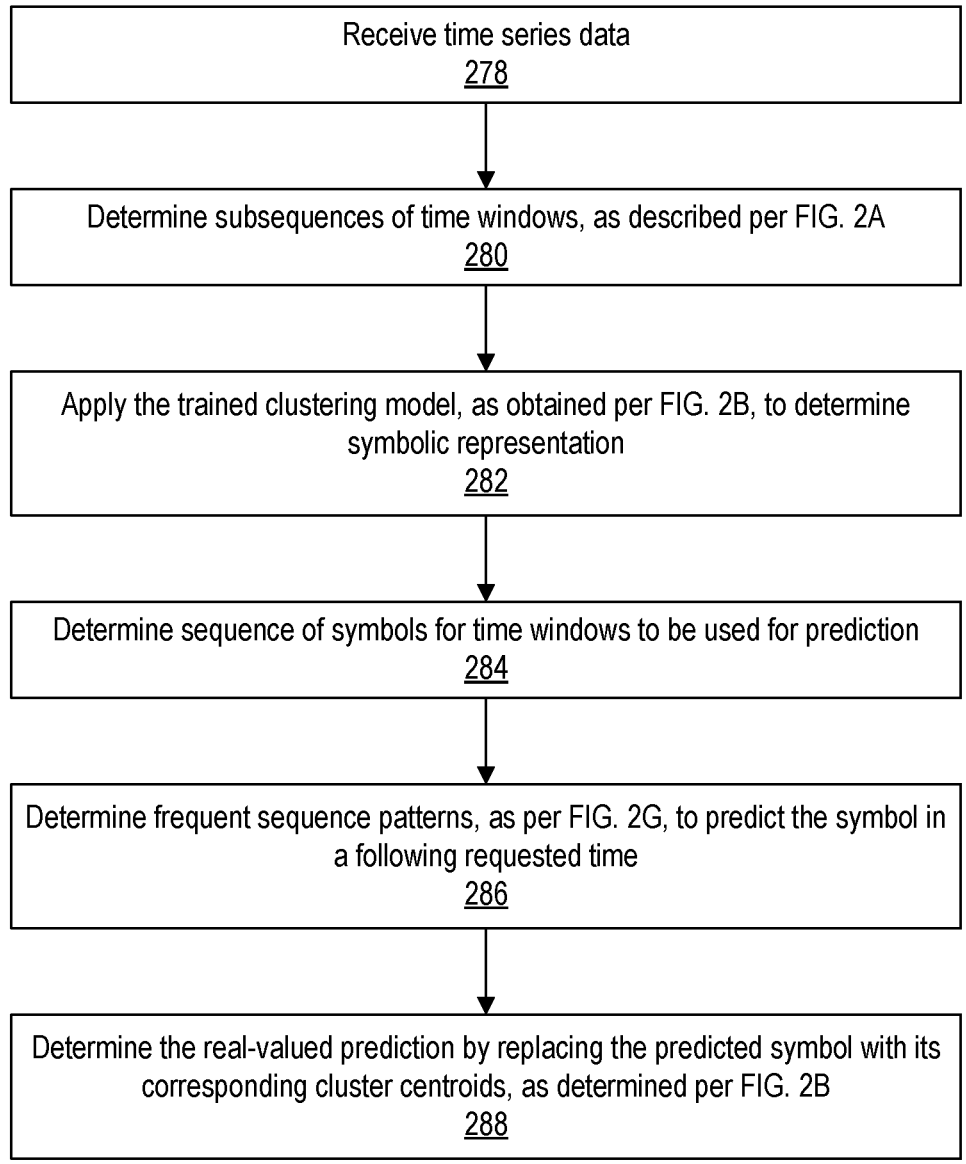
FIG. 2H depicts a flow diagram of an example process for performing a time series forecast, according to implementations of the present disclosure.

FIG. 2H depicts a flow diagram of an example process for performing a time series forecast, according to implementations of the present disclosure.

Time series data may be received (278).

Subsequences of time windows may be determined (280), as described per FIG. 2A.

A trained clustering model, as obtained per FIG. 2B, may be applied (282) to determine symbolic representation.

A determination may be made (284) of a sequence of symbols for time windows to be used for prediction.

Frequent sequence patterns may be determined (286), as described per FIG. 2G, to predict the symbol in each of one or more following requested times.

A real-valued prediction may be determined (288) by replacing the predicted symbol with its corresponding cluster centroids, as determined per FIG. 2B.

Figure 3:
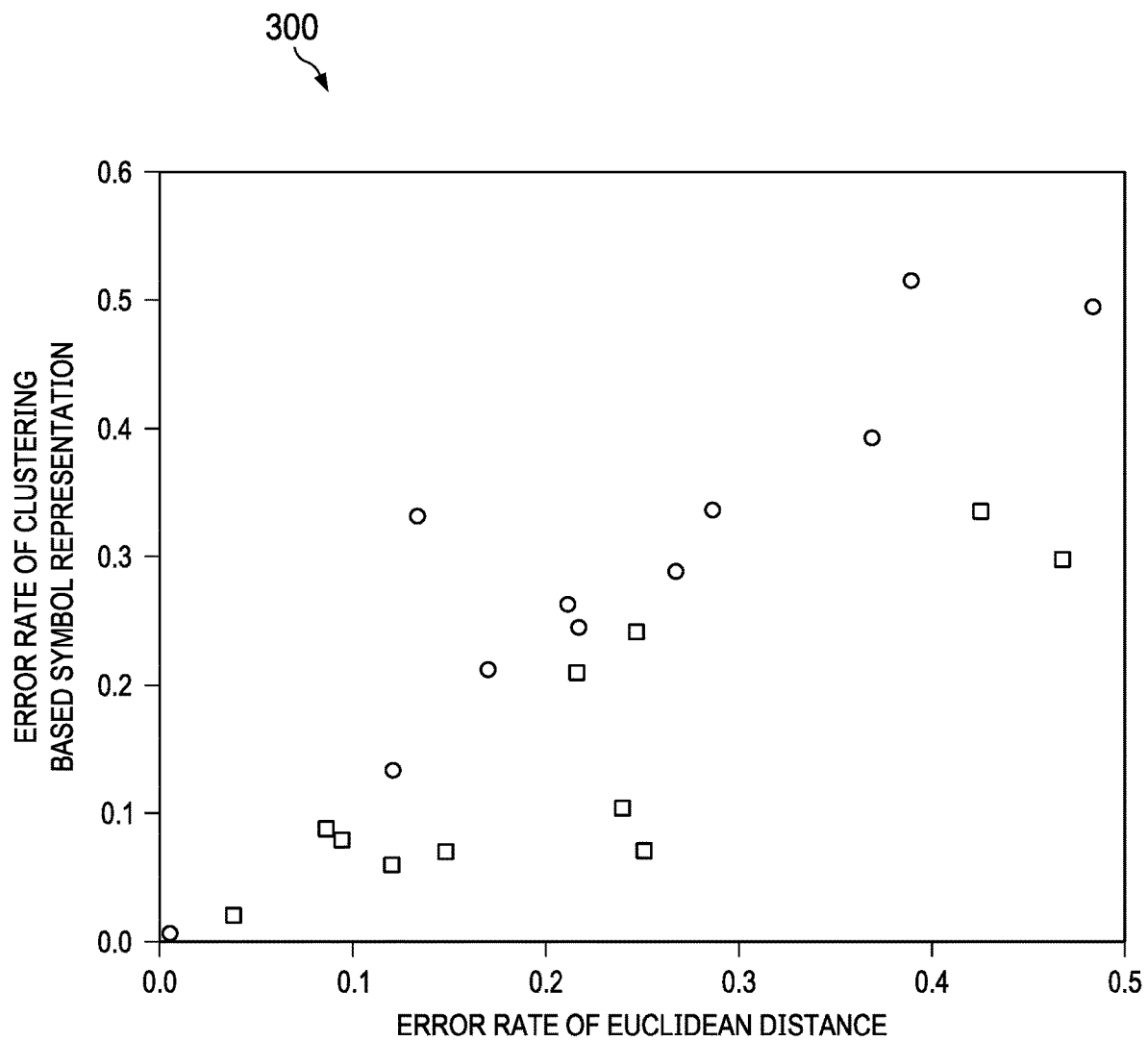
FIG. 3 depicts a graph showing example results of time series data analysis using clustering based symbolic representation, according to implementations of the present disclosure.

FIG. 3 depicts a graph showing results of time series classification using a Euclidean distance approach compared to using a clustering based symbolic representation approach according to implementations of the present disclosure. FIG. 3 provides a summary of this data of Table 1 in a graph 300, and compares the results of classification based on Euclidean distance to the results of clustering based symbolic representation. In the graph 300 of FIG. 3, the error rates resulting from the two approaches are graphed. The squares correspond to datasets in which better performance resulted from using the clustering based symbolic representation. The circles correspond to datasets in which better performance resulted from using the Euclidean distance approach. As shown in FIG. 3, use of the clustering based symbolic representation produces results that are comparable to those resulting from the Euclidean distance approach and, for some of datasets, the clustering based symbolic representation exhibits better performance than the Euclidean distance approach.

Figure 4:
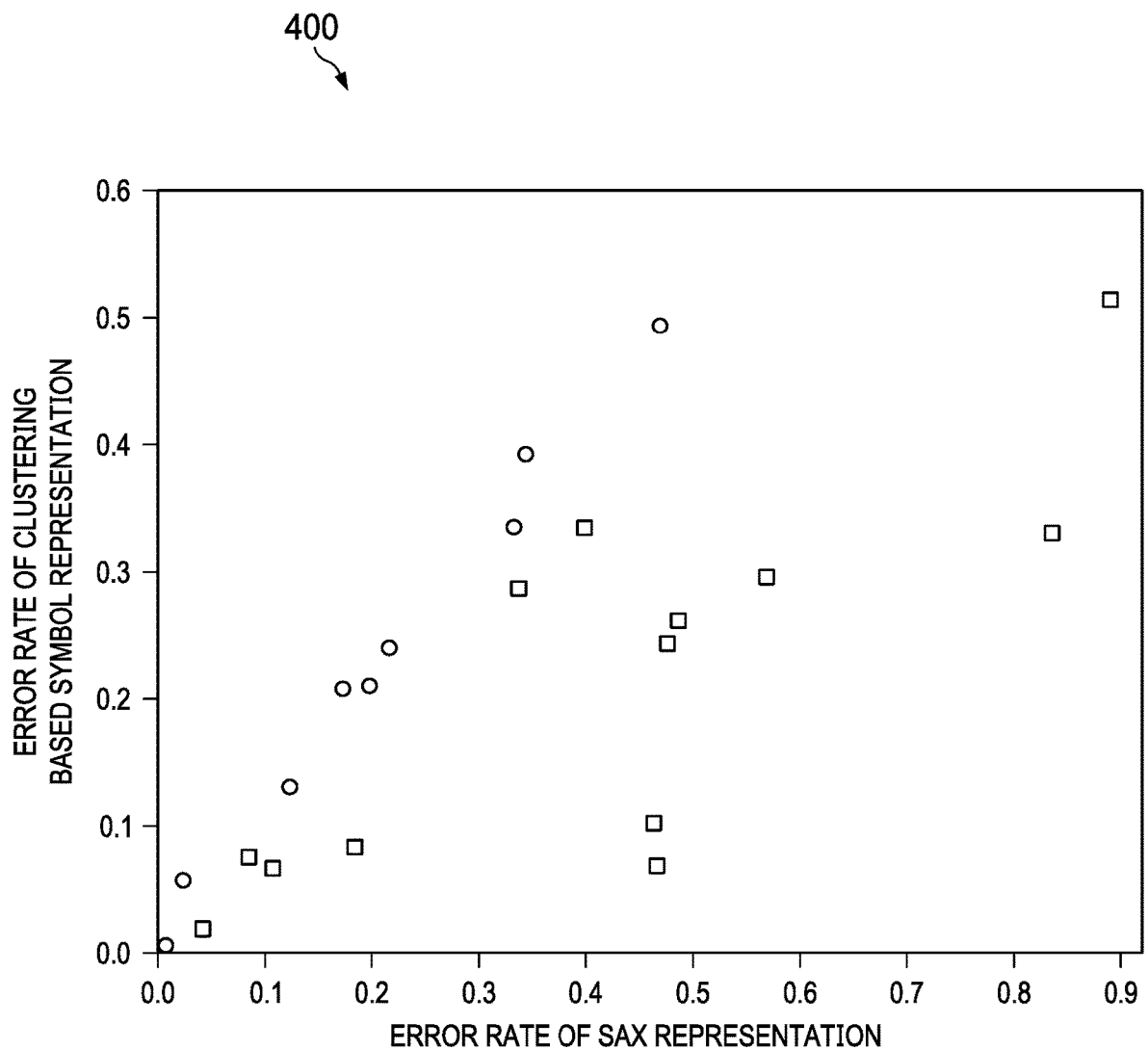
FIG. 4 depicts a graph showing example results of time series data analysis using clustering based symbolic representation, according to implementations of the present disclosure.

FIG. 4 depicts a chart showing results of data analysis using a SAX representation approach compared to using a clustering based symbolic representation approach according to implementations of the present disclosure. FIG. 4 provides a summary of the data of Table 1 in a graph 400, and compares the results of classification based on the SAX representation to the results of clustering based symbolic representation. In the graph 400 of FIG. 4, the error rates resulting from the two approaches are graphed. The squares correspond to datasets in which better performance resulted from using the clustering based symbolic representation. The circles correspond to datasets in which better performance resulted from using the SAX approach. As shown in FIG. 4, there were thirteen datasets, represented by squares, with higher accuracy from using the clustering based symbolic representation. Further, as shown in FIG. 4, the nine datasets where the SAX representation has higher accuracy, are linearly correlated. Thus, even in instances where the SAX representation has relatively higher accuracy, the error rates from the clustering based symbolic representation do not exhibit significant difference compared to the SAX approach. The data in Table 1, as represented in FIGS. 3 and 4, show that the clustering based symbolic representation performed according to implementations described herein may perform at least as well as the Euclidean distance and SAX algorithms and, in some cases, at least some instances the clustering based symbolic representation exhibits higher accuracy than these two currently used techniques.

To demonstrate the clustering-based symbolic representation for time series classification, time series datasets have been used in the experiments as described above with reference to Table 1 and FIGS. 3 and 4. In one experiment, the clustering based symbolic representation was used in time series classification in which 22 online datasets were tested, with results listed in Table 1. As a baseline, the results were compared to those based on Euclidean distance, which showed that the clustering based symbolic representation performed at least as good and in some instances better than a Euclidean distance algorithm, as shown in FIG. 3. Further, in comparison to SAX the clustering based symbolic representation showed better performance in thirteen datasets and similar accuracy for nine other datasets, as shown in FIG. 4.

Figure 5:
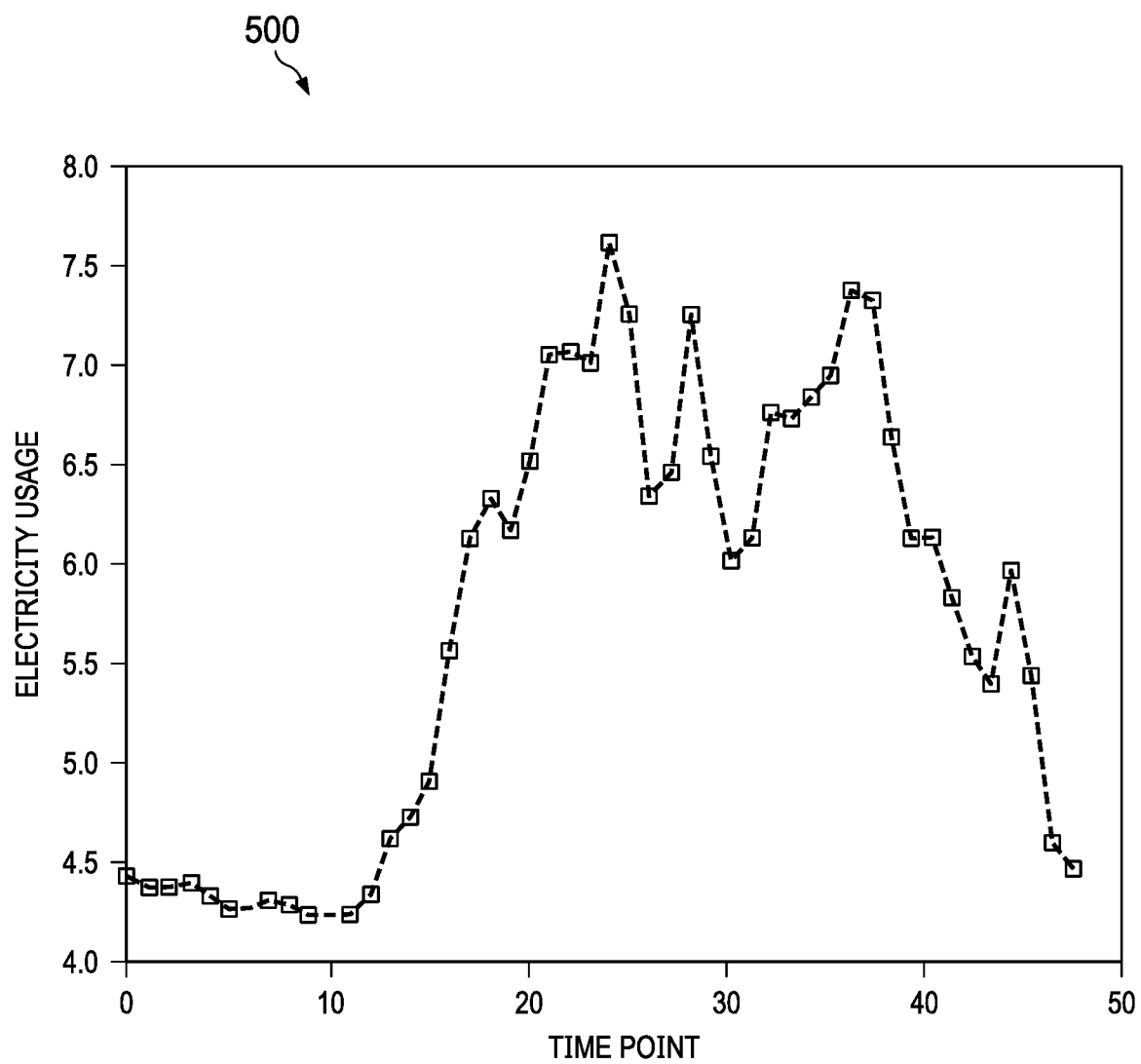
FIG. 5 depicts a graph showing example results of time series data analysis using clustering based symbolic representation, according to implementations of the present disclosure.
Figure 6:
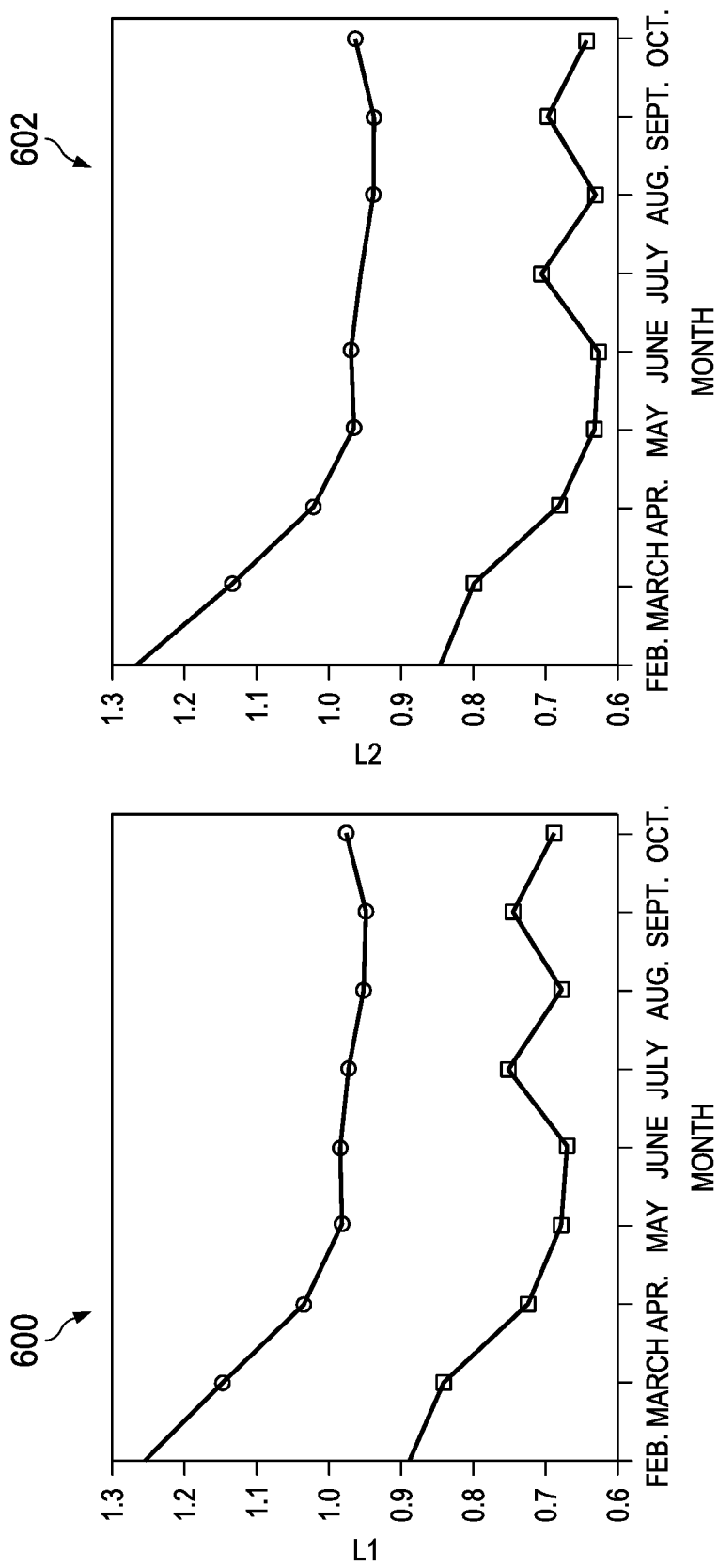
FIG. 6 depicts graphs showing example results of time series data analysis using clustering based symbolic representation, according to implementations of the present disclosure.

FIG. 5 and FIG. 6 depicts a chart showing results of time series forecasting of example energy usage data, using a clustering based symbolic representation approach according to implementations of the present disclosure. In some implementations, the clustering based symbolic representation may be used for time series forecast. For example, the clustering based symbolic representation may be used for a time series forecast to analyze energy consumption data. To demonstrate this aspect, an experiment was performed in which an example dataset of daily electricity usage data, as time series data, was generated and analyzed. For each time series, the electricity usage was measured every 30 minutes, to provide 48 time points in a time series that spans a day. Given the electricity usage in the past hours, an analysis was performed to predict the electricity usage in next specified time points. For example, in the experiment summarized with regard to FIG. 6, the electricity usage in the past 4.5 hours was analyzed to predict the usage in next 1.5 hours. In an energy management scenario, it may be more practical to perform a prediction based on monthly aggregated electricity usage. Thus, as a data preprocessing step, the daily time series was first aggregated into a monthly based time series by calculating the mean value of time series for one customer collected in one month.

FIG. 5 shows one sample monthly time series of energy usage data, from which 20341 monthly based time series were obtained. To perform time series forecast, the aggregated time series were first transformed into the clustering based symbolic representation described herein. In the new representation, it was specified that a single time window includes three time points (totaling 1.5 hours), and thus there are 16 time windows in a single time series. The K-means algorithm was performed by setting the number of clusters as 100. Based on the representation, the time series forecast problem is converted into a multi-class classification problem, where the Random Forest algorithm is selected as the classification method. The input to the Random Forest algorithm includes the assigned symbols for three time windows (4.5 hours) and the target is the symbol for the following time window (1.5 hours). In the experiment, the electricity usage data collected in the first 22.5 hours in one day was used for training, and the trained models were applied to predict the last 1.5 hours of the day, to test the algorithm. Given that a symbol is provided as the prediction of the Random Forest classification, to obtain the final forecast the predicted symbol was replaced with the centroid vector of its corresponding cluster identified in the new representation. In this way, the predicted electricity usage of the three time points (for the final 1.5 hours of the day) can be obtained in one prediction.

The performance of using clustering based symbolic representation for time series forecast is shown in Table 2 below, which shows the calculated L1 and L2 loss functions of the difference between the predicted electricity usage and the actual usage.

TABLE 2

| Method | L1 loss function | L2 loss function |
|---|---|---|
| Classification with Representation | 0.675 | 0.434 |
| Regression on original time series | 1.158 | 0.783 |

As described above, to predict 1.5 hours of electricity usage three time points are included. Thus, in this example a vector of electricity usage with three elements is derived as the prediction. Therefore, the L1 loss function is calculated as the element-wise sum of absolute difference between the predicted electricity usage vector and the actual electricity usage vector. The L2 loss function is calculated as the Euclidean distance between the two vectors. Table 2 compares the results of using the clustering based symbolic representation (in the first row) to those obtained by performing a lasso regression algorithm on the original real-value time series (in the second row). As shown in Table 2, the accuracy of time series forecast based on the clustering based symbolic representation is higher than that achieved by performing regression on the original time series.

FIG. 6 depicts charts showing a comparison of a time series forecast based on the clustering based symbolic representation, according to implementations described herein. Considering there is a seasonal impact on electricity usage, the electricity usage prediction may be performed on each month to improve the accuracy of prediction. Thus, further experiments were conducted by splitting the time series data according to the collecting date and performing the same algorithm. FIG. 6 shows the performance of electricity usage prediction for each month, in two charts that use the L1 and L2 loss functions as evaluation metrics respectively in charts 600 and 602. In these charts, the top line corresponds to performing regression on the original time series directly and the bottom line corresponds to prediction based on the clustering-based symbolic representation. The L1 loss function and the L2 loss function have been used as evaluation metrics, plotted on the vertical axis. FIG. 6 indicates that the prediction based on the clustering based symbolic representation exhibits higher accuracy for all months evaluated by L1 and L2.

In addition to higher accuracy of results compared to previously used techniques, the clustering based symbolic representation also provides other technical advantages and improvements compared to previously used techniques. For example, the predictions based on the clustering based symbolic representation are performed more efficiently, e.g., make more efficient using of processing capabilities, compared to previously used methods. As discussed above, one symbol is used to replace the subsequence of a single time window. For example, in the experiments described above, three time points in a time window are represented by one symbol. Therefore, when performing the multi-class classification where the target is defined as one symbol, it is efficient to predict the electricity usage of all the three points in a single window simultaneously using the clustering based symbolic representation. Moreover, the prediction for three time points (1.5 hours) are based on the same electricity usage in the past 4.5 hours. Thus, using the implementations described herein, at one time point it is not necessary to wait for measuring the actual electricity usage before predicting for the following time point. This is an improvement over techniques that use regression for electricity usage prediction, given that a regression model can only predict the usage in a single next time point. Using the regression model, three regression models are required to predict 1.5 hours of electricity usage, where one regression model is trained for a single time point. Further, the three regression models cannot be trained at once, because the subsequent regression model can only be trained when the actual electricity measurement for the following time point is available. Thus, implementations provide an advantage in processing efficiency and in the time required to perform the prediction, compared to currently used techniques that employ regression.

In the implementations described herein, a clustering-based symbolic representation is employed for time series data mining. An objective of using such a representation is that after the time series is divided into equally sized time windows, categorical values may be used to represent the subsequences of time windows in an efficient manner. In contrast to the currently used symbolic representation algorithms such as SAX, implementations account for the underlying structure that is present in the subsequences of time windows and use the common features of a cluster to represent time windows. Clustering is performed in which the subsequences of time windows having common features are grouped into clusters. Symbols are assigned to the identified clusters such that the time windows in the same cluster are represented by a single symbol. In contrast to the SAX algorithm, the clustering based symbolic representation is based on the underlying structure of time subsequences. Further, the clustering based representation algorithm can facilitate the dimension reduction and time series discretization within the same algorithm. Also, the clustering based symbolic representation allows prediction for multiple time points to be obtained at one time, which is more efficient compared to currently used methods which use a regression algorithm to make predictions based on the original time series.

Figure 7:
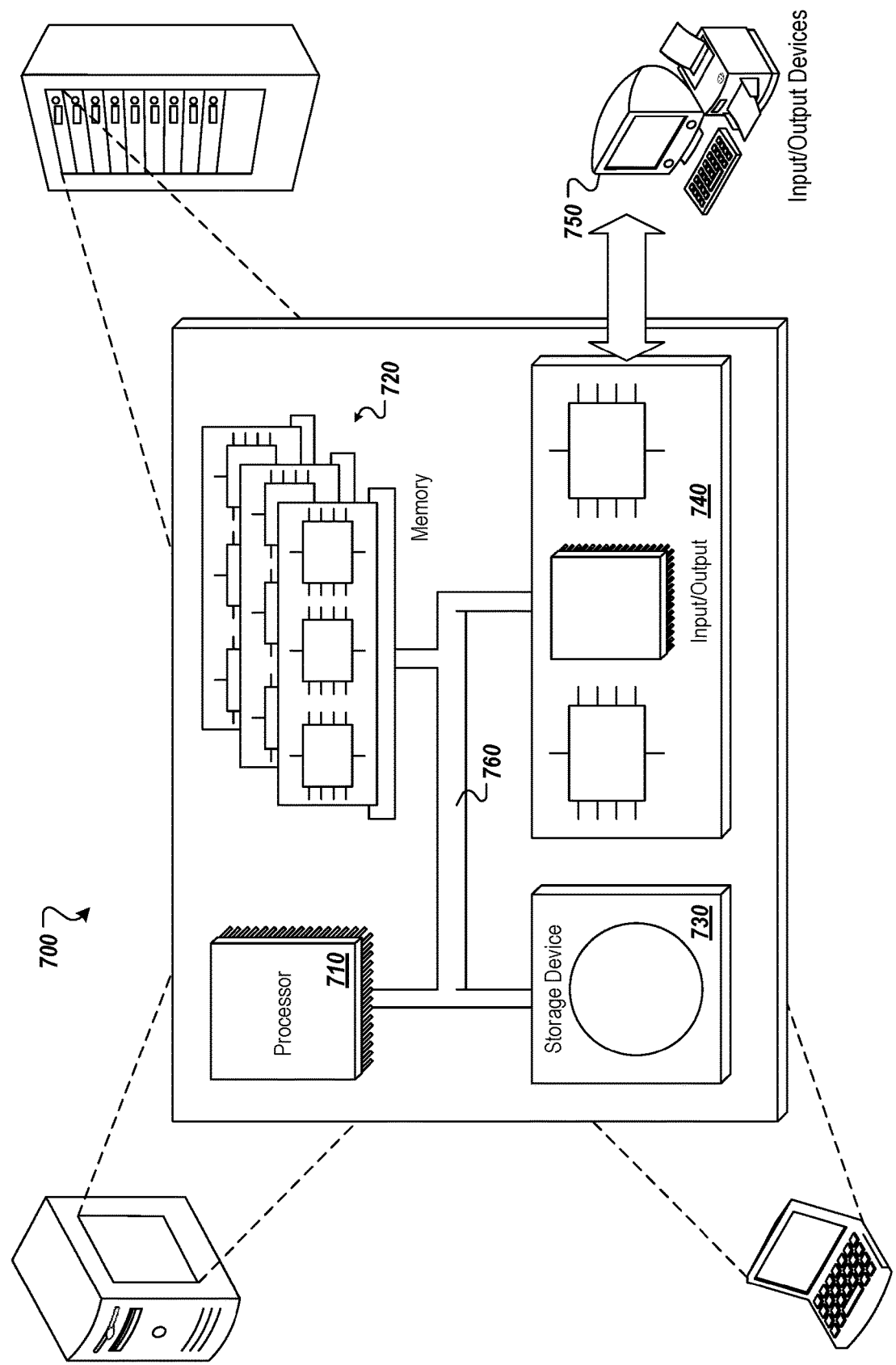
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the analysis device(s) 102, the management device(s) 118, and/or other computing device(s) or system(s) described herein. The system 700 may include one or more processors 710, a memory 720, one or more storage devices 730, and one or more input/output (I/O) devices 750 controllable via one or more I/O interfaces 740. The various components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. For example, the processor(s) 710 may execute instructions for the various software module(s) described herein. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more communication networks using any network protocol.

Computing devices of the system 700 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
 receiving, by the at least one processor, time series data that includes a plurality of time series;
 determining, by the at least one processor, a respective plurality of subsequences of each of the plurality of time series;

generating, by the at least one processor, one or more clusters that each includes a set of the subsequences that exhibit a similar structure;

generating, by the at least one processor, a symbolic representation of the time series data, wherein generating the symbolic representation includes replacing at least one subsequence with a respective symbol corresponding to a cluster that includes the replaced subsequence; and employing, by the at least one processor, the symbolic representation to generate at least one prediction.

2. The method of claim 1, further comprising:

based on the at least one prediction, transmitting, by the at least one processor, at least one signal to alter operation of a service, including performing, discontinuing, or adjusting an action of the service.

3. The method of claim 1, wherein the respective symbol for a cluster corresponds to the centroid of the cluster.

4. The method of claim 1, wherein the respective symbol for a cluster describes at least one characteristic of the set of the subsequences in the cluster.

5. The method of claim 1, wherein the similar structure exhibited by the set of the subsequences in a cluster includes one or more of an increase, a decrease, and an inflection exhibited by the set of the subsequences in the cluster.

6. The method of claim 1, wherein the one or more clusters are generated using a K-means clustering algorithm.

7. The method of claim 1, wherein employing the symbolic representation to generate the at least one prediction further comprises:

receiving time series training data with target values;

executing a classification algorithm to train a classification model based at least partly on the time series training data; and employing the classification model to determine the at least one prediction.

8. The method of claim 7, wherein the classification algorithm is a Random Forest algorithm.

9. The method of claim 7, further comprising:

receiving, by the at least one processor, additional time series data that has a same time structure as the time series training data;

discretizing, by the at least one processor, the additional time series data according to the symbolic representation; and providing, by the at least one processor, the discretized additional time series data as input to the classification model to determine the at least one additional prediction based on the discretized additional time series data.

10. The method of claim 9, wherein the at least one additional prediction includes at least one target label for the additional time series data.

11. A system comprising:

at least one processor; and a memory communicatively coupled to the at least one processor, the memory storing instructions which, when executed, cause the at least one processor to perform operations comprising:

receiving time series data that includes a plurality of time series;

determining a respective plurality of subsequences of each of the plurality of time series;

generating one or more clusters that each includes a set of the subsequences that exhibit a similar structure;

generating a symbolic representation of the time series data, wherein generating the symbolic representation includes replacing at least one subsequence with a respective symbol corresponding to a cluster that includes the replaced subsequence; and employing the symbolic representation to generate at least one prediction.

12. The system of claim 11, the operations further comprising:

based on the at least one prediction, transmitting at least one signal to alter operation of a service, including performing, discontinuing, or adjusting an action of the service.

13. The system of claim 11, wherein the respective symbol for a cluster corresponds to the centroid of the cluster.

14. The system of claim 11, wherein the respective symbol for a cluster describes at least one characteristic of the set of the subsequences in the cluster.

15. The system of claim 11, wherein the similar structure exhibited by the set of the subsequences in a cluster includes one or more of an increase, a decrease, and an inflection in the set of the subsequences in the cluster.

16. The system of claim 11, wherein the one or more clusters are generated using a K-means clustering algorithm.

17. The system of claim 11, wherein employing the symbolic representation to generate the at least one prediction further comprises:

receiving time series training data with target values;

executing a classification algorithm to train a classification model based at least partly on the time series training data; and employing the classification model to determine the at least one prediction.

18. The system of claim 17, wherein the classification algorithm is a Random Forest algorithm.

19. The system of claim 17, the operations further comprising:

receiving additional time series data that has a same time structure as the time series training data;

discretizing the additional time series data according to the symbolic representation; and providing the discretized additional time series data as input to the classification model to determine the at least one additional prediction based on the discretized additional time series data.

20. One or more non-transitory computer-readable storage media storing instructions which, when executed, cause at least one processor to perform operations comprising:

receiving time series data that includes a plurality of time series;

determining a respective plurality of subsequences of each of the plurality of time series;

generating one or more clusters that each includes a set of the subsequences that exhibit a similar structure;

generating a symbolic representation of the time series data, wherein generating the symbolic representation includes replacing at least one subsequence with a respective symbol corresponding to a cluster that includes the replaced subsequence; and employing the symbolic representation to generate at least one prediction.

* * * * *